United States Patent
Rubins et al.

(10) Patent No.: US 7,830,271 B2
(45) Date of Patent: *Nov. 9, 2010

(54) AUDIO COORDINATED VISUAL INDICATOR

(76) Inventors: Tye Rubins, 11320 Chandler Blvd., #G, North Hollywood, CA (US) 91601; Jon Sanserino, 11559 Morrison St., North Hollywood, CA (US) 91601

( * ) Notice: Subject to any disclaimer, the term of this patent is extended or adjusted under 35 U.S.C. 154(b) by 0 days.

This patent is subject to a terminal disclaimer.

(21) Appl. No.: 11/857,395

(22) Filed: Sep. 18, 2007

(65) Prior Publication Data

US 2009/0066493 A1 Mar. 12, 2009

Related U.S. Application Data

(60) Provisional application No. 60/970,461, filed on Sep. 6, 2007.

(51) Int. Cl.
*G08B 3/00* (2006.01)

(52) U.S. Cl. ............... 340/691.1; 455/563; 455/90.1; 704/200; 704/270; 381/95

(58) Field of Classification Search ........... 340/691.1, 340/90, 563, 564; 455/90, 563, 564, 90.1; 704/200, 231, 235, 246, 270, 275; 381/95, 381/96, 97, 86
See application file for complete search history.

(56) References Cited

U.S. PATENT DOCUMENTS

| | | | |
|---|---|---|---|
| 5,208,483 | A | 5/1993 | Reneau |
| 5,556,224 | A * | 9/1996 | Niskanen ............. 403/379.2 |
| 5,566,224 | A | 10/1996 | ul Azam et al. |
| 6,208,359 | B1 * | 3/2001 | Yamamoto ............ 345/473 |
| 6,225,897 | B1 | 5/2001 | Doyle et al. |
| 6,262,657 | B1 | 7/2001 | Okuda et al. |
| 6,349,222 | B1 * | 2/2002 | Hafiz ................. 455/569.2 |
| 6,353,778 | B1 | 3/2002 | Brown |
| 6,556,810 | B2 | 4/2003 | Suzuki |
| 6,599,243 | B2 | 7/2003 | Woltermann et al. |
| 6,718,187 | B1 * | 4/2004 | Takagi et al. .......... 455/569.2 |
| 6,731,925 | B2 | 5/2004 | Naboulsi |

(Continued)

FOREIGN PATENT DOCUMENTS

JP 2004-282380 A 10/2004

(Continued)

OTHER PUBLICATIONS

International Search Report from PCT/US2008/075508, dated Jun. 25, 2009.

*Primary Examiner*—Benjamin C Lee
*Assistant Examiner*—Edny Labbees
(74) *Attorney, Agent, or Firm*—Greenberg Traurig LLP; Christopher Darrow, Esq.

(57) ABSTRACT

An audio-coordinated visual indicator device reducing vehicle operator distraction associated with using a communications device during vehicle operation. The visual indicator being placed within the operator's field of view and provides a synchronized visual display associated with the output from the communication device. Providing an apparent visual anchor for the incoming sound freeing up the operator's mental resources, reduces distraction and allows greater attention to be placed on operation. Comprising of a receiver; a visual indicator connected to an output of the receiver having an attribute that varies according to the received signal from the communication device.

15 Claims, 4 Drawing Sheets

U.S. PATENT DOCUMENTS

| | | |
|---|---|---|
| 6,812,942 B2 * | 11/2004 | Ribak .......................... 345/30 |
| 6,816,731 B1 | 11/2004 | Maruyama |
| 6,973,333 B1 | 12/2005 | O'Neil |
| 6,983,170 B2 | 1/2006 | Stulberger |
| 7,049,941 B2 | 5/2006 | Rivera-Cintron et al. |
| 7,054,352 B2 | 5/2006 | Hasegawa |
| 7,117,152 B1 * | 10/2006 | Mukherji et al. ............. 704/235 |
| 7,236,776 B2 | 6/2007 | Nath et al. |
| 7,308,289 B2 * | 12/2007 | Sychta ..................... 455/569.1 |
| 2001/0050614 A1 | 12/2001 | Yang |
| 2002/0070852 A1 | 6/2002 | Trauner et al. |
| 2003/0137408 A1 | 7/2003 | Breiner |
| 2004/0121783 A1 | 6/2004 | Chua et al. |
| 2005/0143134 A1 * | 6/2005 | Harwood et al. ............. 455/563 |
| 2006/0040640 A1 | 2/2006 | Thompson et al. |
| 2006/0103513 A1 | 5/2006 | Ihara et al. |
| 2006/0187305 A1 | 8/2006 | Trivedi et al. |
| 2006/0285345 A1 * | 12/2006 | Burnham et al. ............ 362/489 |
| 2007/0041552 A1 | 2/2007 | Moscato |
| 2007/0072553 A1 | 3/2007 | Barbera |
| 2007/0142024 A1 * | 6/2007 | Clayton et al. .............. 455/403 |
| 2007/0229234 A1 | 10/2007 | Smith |
| 2008/0002668 A1 * | 1/2008 | Asokan et al. .............. 370/352 |
| 2008/0132220 A1 * | 6/2008 | Fitzgibbon .................. 455/420 |

FOREIGN PATENT DOCUMENTS

| | | |
|---|---|---|
| JP | 2006303845 | 2/2006 |
| JP | 2006279796 | 12/2006 |

* cited by examiner

AUDIO COORDINATED VISUAL INDICATOR

RELATED APPLICATION

This application claims the benefit of and priority to U.S. Provisional Application Ser. No. 60/970,461, filed Sep. 6, 2007, the contents of which are incorporated by reference herein in its entirety.

BACKGROUND

The present disclosure relates, in general to a hands free communication device apparatus for a use in a vehicle during vehicle operation.

The present disclosure relates, in general, to the field of audio communication devices; and, in particular, to an invention that reduces the distraction that results from using an audio communication device while operating any vehicle.

For example, a number of studies and anecdotal reports conclude that using a cellular telephone while driving is a major contributing factor in traffic accidents. One study found that using a cellular telephone while driving was more deleterious than alcohol intoxication. Consequently, some state and local governments have enacted laws that regulate the use of cellular telephones and mandate that only "hands free" cellular telephones may be used in moving vehicles.

These hand's free laws are predicated on the assumption that holding the cellular telephone in one hand while driving the vehicle with the other hand distracts the operator. This is inherently fallacious since it is widely know that many operators use only one hand while driving; and that there is no evidence of one-armed individuals have higher accident rates than the general population, all other factors being equal.

Existing inventions and these laws have not addressed the underlying evolutionary psychological and physiological nature of human survival mechanisms. That is, three-dimensional sound processing is the first line of defense for survival since it allows the detection of potential dangers from all directions, in all lighting conditions, and at greater distances than any other sense. It is the last faculty to go to sleep and the first to wake up. It is the reason the ears face in the same direction as the eyes, forward.

The sense of hearing is so crucial to survival that it has priority with respect to the brain's processing resources as the brain continuously compares the location, in three-dimensional space, and the content of every sound to memories of either safe or potentially threatening sounds.

Sound location is an inherent rather than a learned behavior. It is the reason that a vehicle operator listening to a person on his right will periodically turn to the right as if to confirm the voice's source. It is also the reason, if the person in back is talking, that a vehicle operator may continually look in the rear-view mirror to the point of complete distraction.

A subconscious decision is made for each sound as to whether or not, and how often, a visual confirmation of the sound's location is required. This visual confirmation need be nothing more than the momentarily shifting of the eyes' attention to something that appears to be in synchronicity with what the ears are hearing.

An evolved hierarchy dependent on the sound's content and location dictates the level of attention, i.e. brain processing resources, each sound receives. When viewed only with respect to a sound's location, this hierarchy is easily discerned.

Considered in ascending order, sounds within the peripheral vision which can be easily identified with a slight movement of the eyes are the least mentally taxing. Next, sounds in back, once identified, only need to be continuously monitored for change. Then sounds directly in front receive a great deal of attention because they are the focus of the eyes and ears. And, at the top, demanding immediate attention is that unique human attribute, the internal voice, which we can call the voice of the conscious mind.

The most distracting location for the sound generating portion of any audio communication device, in terms of mental resource allocation, would be covering both ears and excluding outside extraneous sounds because this situation mimics the sound of the internal voice or conscious mind. The next level distracting situation would be a device on or in one only ear that excluded extraneous sounds. After this, the next distracting situation is a sound source that is away from the head, allows for extraneous sounds to enter the ears, and is omni-directional, which makes it devoid of clues as to the sound's location. The least distracting, compared to the above, is a device that is held in one hand up to and near one ear because extraneous sounds are intermittent and the device's position in the hand provides some tactical information as to the sound's location.

Until an apparent visual connection between the sound and its source is made, a compounding feedback loop is created between a sound and the perception by the ears to the detriment of all other mental activity. The end result is less attention given to operating the vehicle.

Audio communications devices in vehicles will remain problematic until they satisfy the powerful evolutionary psychological and physiological human need to know a sound's source.

SUMMARY

Disclosed is an audio-coordinated visual indicator device that reduces vehicle operator distraction associated with the vehicle operator's using an audio communications device while the vehicle is moving.

The visual indicator must be placed within the operator's field of view and provide some kind of movement in synchronicity with the incoming sound from the auto communication device. It provides an apparent visual anchor for the incoming sound which frees up the vehicle operator's mental resources, reduces distraction and allows greater attention to be placed on operating the vehicle.

The audio-coordinated visual indicator is comprised of an input device capable of detecting an audio-related signal from a communication device; a visual indicator connected to an output of the input device, and the output having an attribute that directly varies according to variations of a signal received by the communication device.

The audio-coordinated visual indicator may be comprised of any device that can visibly represent a sound in synchronicity with an audio signal. It may include, but not be limited to, a light bulb, an LED, a mechanical flag device, two or more light sources such as LED's arranged in a pattern, or it could be a display screen image.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

An audio-coordinated visual indicator device in accordance with the present disclosure is designed for use in a vehicle when the vehicle's operator is using an audio communication device, such as, but not limited to, a cellular telephone or 2-way radio.

Figure 1:
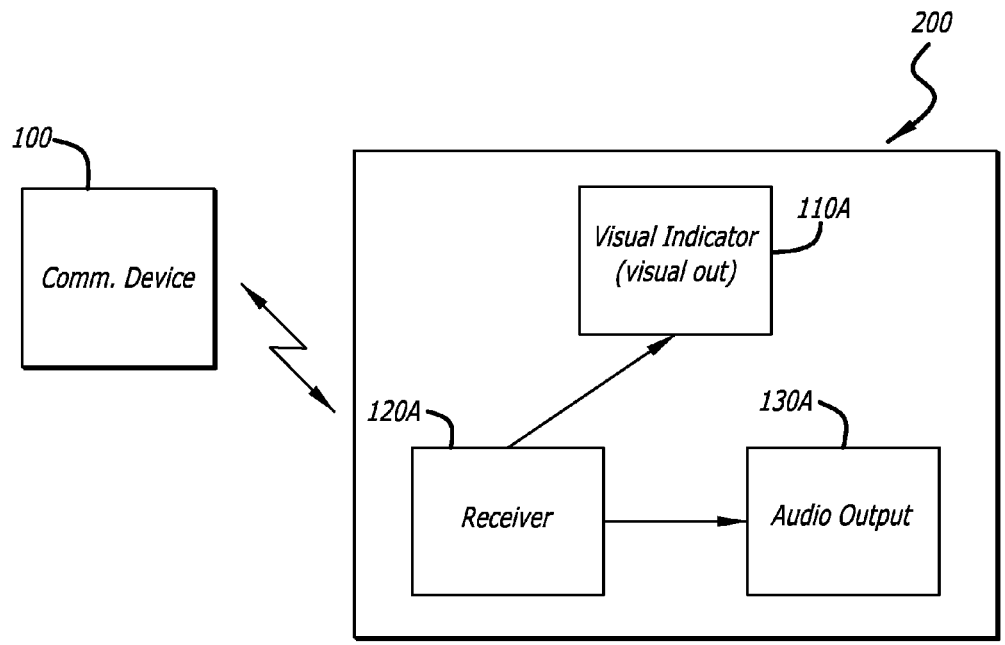
FIG. 1 is a block diagram according to one embodiment of the audio-coordinated visual indicating device in accordance with the present disclosure.

In one embodiment of the audio-coordinated visual indicator device 200 is shown in FIG. 1. The device 200 may include both a receiver 120A, and a visual indicator 110A in communication with and controlled by the receiver 120A. The device may or may not include an audio output speaker or ear speaker output jack 130A.

During the use of the communication device 100, audio signals received by the communication device 100 are converted and routed, or otherwise transmitted to one or more audio output device 130A that can reproduce or output sound at a decibel level loud enough for the operator to hear without putting the communication device next to his or her ear. In one embodiment, the audio output device may be that which is normally used to output sounds from a vehicle's stereo system. In another embodiment, the audio output device may be a dedicated speaker installed in the vehicle for the purposes of this disclosure. In another embodiment, it could be built into a portable housing. In still another embodiment, the audio output device may be a component of the communication device 100 itself.

The received signal that is converted and transmitted to the audio output device is simultaneously routed, or otherwise transmitted to the visual indicator 110A. The visual indicator 110A displays a visual representation of the audio output 130A that varies directly in proportion to the receiver-routed signal received from the communication device 100.

Figure 2:
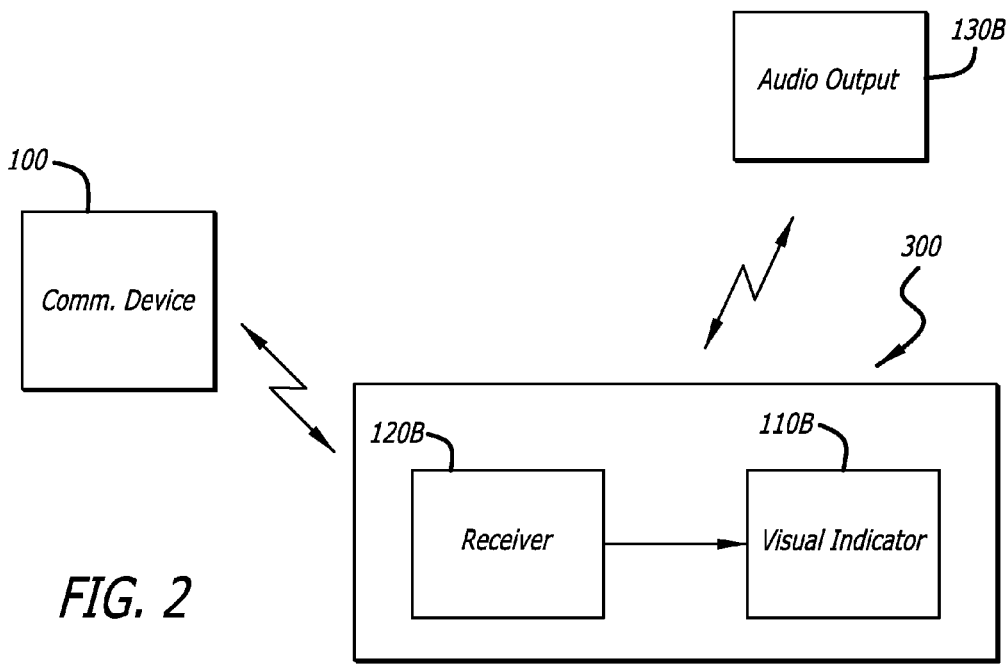
FIG. 2 is another block diagram according to another embodiment of the audio-coordinated visual indicating device in accordance with the present disclosure.

In one embodiment, shown in FIG. 2, an audio-coordinated visual indicator device 300 may include: a receiver 120B and a visual indicator 110B. In this embodiment, the audio-coordinated visual indicator device may be provided in a housing or may be integrated within an entertainment system of the vehicle and provide for wirelessly connecting or coupling through the vehicle entertainment system's audio output 130B and to the communication device 100.

Figure 3:
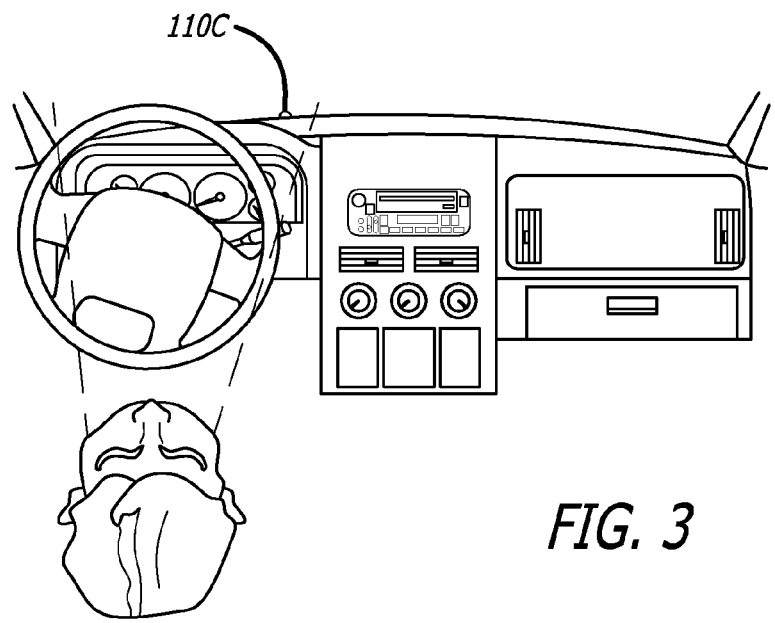
FIG. 3 is a diagrammatic plan view of an operator of a vehicle sitting at the steering wheel with a visual indicating located within the operator's field of vision in accordance with the present disclosure.

In one embodiment, a visual indicator 110C may be a single lamp as shown in FIG. 3.

Figure 5:
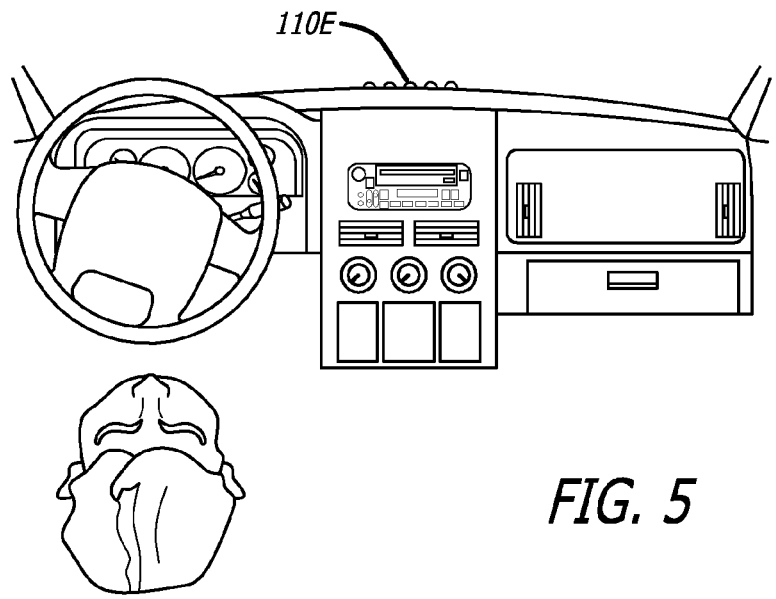
FIG. 5 is an embodiment of the visual indicator which includes a series of LED's.

In one embodiment, a visual indicator 110E may be one or more light emitting diodes (LED's) as shown in FIG. 5.

Figure 4:
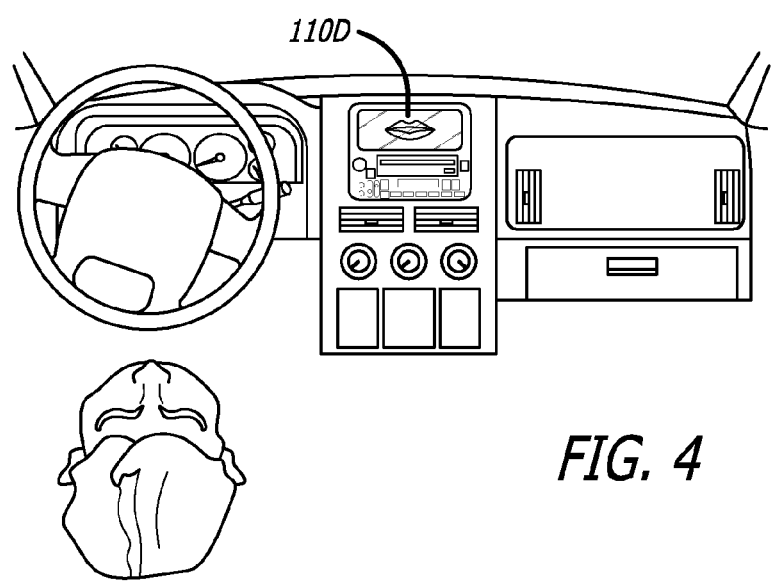
FIG. 4 is one embodiment of the visual indicator which includes a display screen image.

In one embodiment, a visual indicator 110D may be an image displayed within the vehicle on a display screen as in FIG. 4. For example, a digital display that mimics a pair of lips could move to "mouth" a voice being received by the communications device. The visual indicator may be as simple as a single lamp that directly varies in intensity with the received audio signal.

Figure 6:
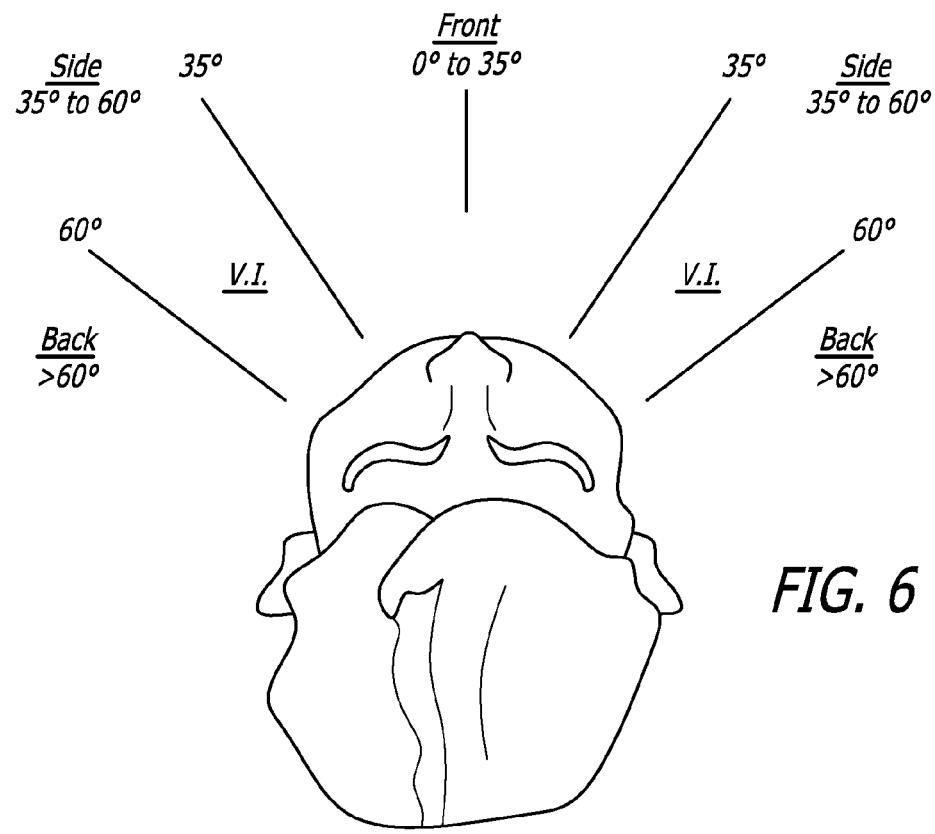
FIG. 6 is a diagram of a human's field of vision, illustrating the visual range by angle.
Figure 7:
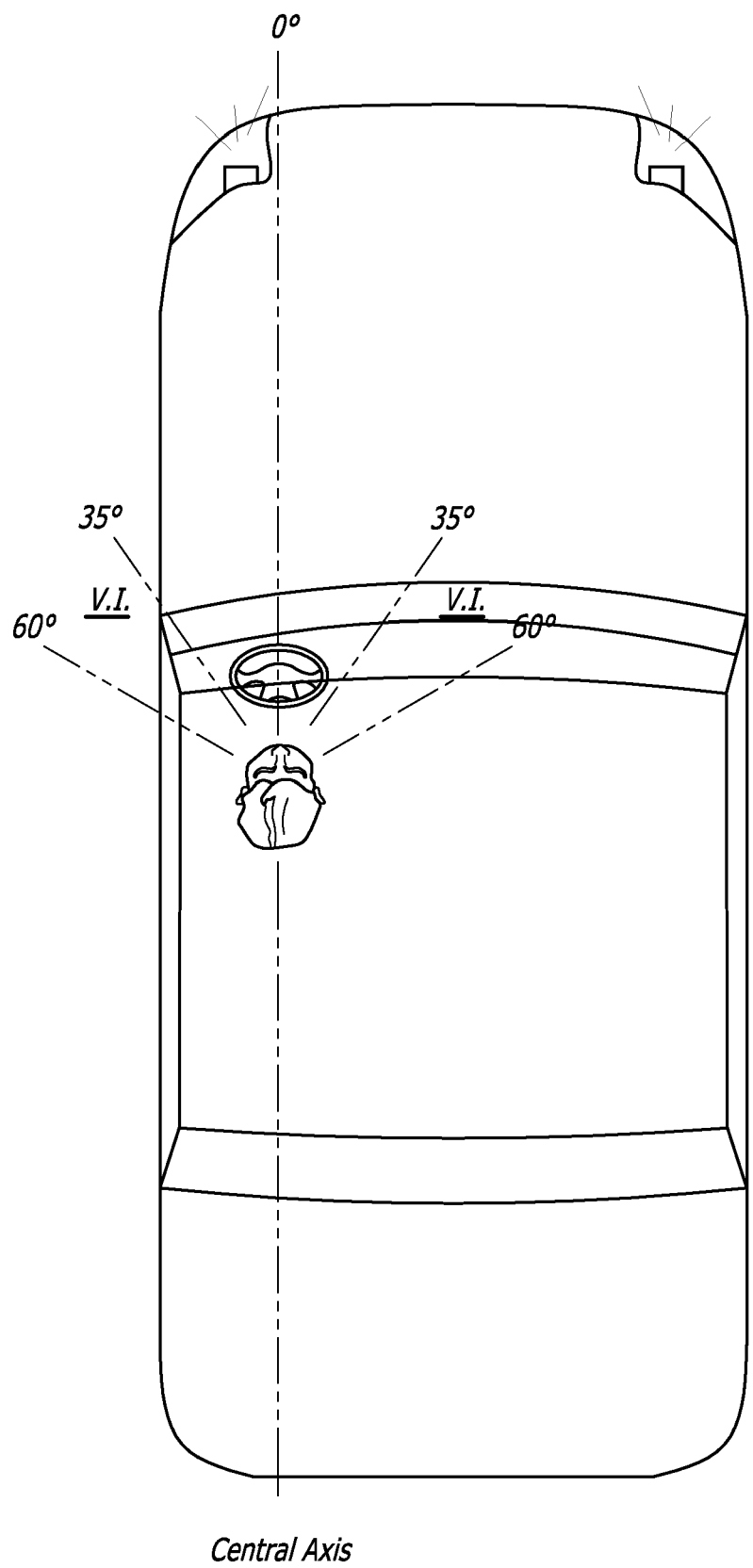
FIG. 7 is a diagram of a vehicle operator's field of view in a vehicle further illustrating potential visual indicator locations.

The audio-coordinated visual indicator device can be placed anywhere within the operator's field of view; however, positioning the visual indicator at an angle between 35 to 65 degrees of a central forward axis of the operator's field of view (As shown in FIG. 3 and FIG. 6) seems to most effectively reduce vehicle operator distraction.

The audio-coordinated visual indicator device may be a portable stand-alone unit incorporating a wireless receiver 120A or 120B and the visual indicator 110A or 110B.

In other embodiments, the audio-coordinated visual indicator could be an indicator connectable to the vehicle entertainment system. In another embodiment the audio-coordinated visual indicator could be completely incorporated into the functionality of the vehicle's entertainment/communication system.

There are many ways in which the audio-coordinated visual indicator device could communicate with the communication device 100. In one aspect, the communication device 100 could physically couple to the audio-coordinated visual indicator by way of a port. In another aspect, the communication device could wirelessly couple with the audio-coordinated visual indicator device. For example, a "Bluetooth" connectivity between the communication device 100 and the audio-coordinated visual indicator device 300, as in FIG. 2. Whenever pairing is established, the visual indicator 110B could automatically be connected in parallel with an audio output 130B and, upon receipt of a signal, to the communication device 100.

The audio-coordinated visual indicator has been described in terms of what are presently considered to be the most practical and preferred embodiments. However, the audio-coordinated visual indicator need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A display system for counteracting the distraction to an operator of a vehicle having a conversation with a person outside the vehicle the display system comprising:
   a communication device having an audio-related signal;
   a speaker responsive to the audio-related signal and having an audio output;
   a display associated with the communication device;
   the speaker having an audio output of spoken words, said spoken words having characteristics of duration and amplitude;
   the display displaying a direct representation of said duration and amplitude characteristics in a non-text to speech format at the same time the speaker is outputting said spoken words; and
   the display being positioned within a vehicle operator's field of view during vehicle operation.

2. The display system according to claim 1, wherein the display displays a direct analog representation of said duration and amplitude characteristics.

3. The display device according to claim 1, wherein the direct representation comprises a single modulated light.

4. The display device according to claim 1, wherein the direct representation comprises an LED array.

5. A display device for counteracting the distraction to an operator of a vehicle caused by the operator using a communication device during operation of the vehicle and having a conversation with a person outside the vehicle, the display device comprising:
- a communication device having an audio-related output signal;
- a receiver capable of detecting the audio-related output signal of the communication device and said receiver having a receiver output signal;
- the receiver output signal representing spoken words, each word having a duration and amplitude;
- a speaker responsive to the receiver output signal and having an audio output;
- a display responsive to the receiver output signal;
- the display providing a visual representation of the duration and amplitude of the spoken words that varies in proportion to the receiver output signal, in a non-text to speech format, during the progress of the communication; and
- the display being positioned within a vehicle operator's field of view during vehicle operation.

6. The display device according to claim 5, wherein the device provides the vehicle operator with a visual reference for a presumed source of the audio output.

7. The display device according to claim 5, wherein the communication device is a cell phone and wherein the visual indicator is provided on a display screen of the cell phone.

8. The display device according to claim 7, wherein the display screen of the cell phone is a touch screen.

9. A display device for counteracting the distraction to an operator of a vehicle caused by the operator using a communication device during operation of the vehicle and having a conversation with a person outside the vehicle, the display device comprising:
- a communication device having an audio-related signal;
- a speaker responsive to the receiver signal and having an audio output;
- a display device providing a visual representation of the audio output duration and amplitude of the spoken words that varies in proportion to the receiver output signal, in a non-text to speech format, during the progress of the communication; and
- the display device being positioned within a vehicle operator's field of view during vehicle operation to visually provide an apparent source of the audio output.

10. The display device according to claim 9, wherein the display is positioned within an angle between 35 to 60 degrees of a central axis of the operator's field of view.

11. The display device according to claim 1, wherein the communication device is a cell phone and the third party is a person the vehicle operator is conversing with.

12. The display device according to claim 3, wherein the communication device is a cell phone and the third party is a person the vehicle operator is conversing with.

13. The display device according to claim 5, wherein the communication device is a cell phone and the third party is a person the vehicle operator is conversing with.

14. The display device according to claim 7, wherein the communication device is a cell phone and the third party is a person the vehicle operator is conversing with.

15. The display device according to claim 9, wherein the communication device is a cell phone and the third party is a person the vehicle operator is conversing with.

* * * * *